US010018992B2

(12) United States Patent
Ishiwari et al.

(10) Patent No.: US 10,018,992 B2
(45) Date of Patent: Jul. 10, 2018

(54) NUMERICAL CONTROL DEVICE

(71) Applicant: FANUC Corporation,
Minamitsuru-gun, Yamanashi (JP)

(72) Inventors: Hisateru Ishiwari, Minamitsuru-gun (JP); Hideaki Maeda, Minamitsuru-gun (JP); Kazuo Sato, Minamitsuru-gun (JP)

(73) Assignee: FANUC Corporation,
Minamitsuru-gun, Yamanashi (JP)

( * ) Notice: Subject to any disclaimer, the term of this patent is extended or adjusted under 35 U.S.C. 154(b) by 234 days.

(21) Appl. No.: 14/887,515

(22) Filed: Oct. 20, 2015

(65) Prior Publication Data

US 2016/0109877 A1    Apr. 21, 2016

(30) Foreign Application Priority Data

Oct. 21, 2014  (JP) ................................ 2014-214733

(51) Int. Cl.
G05B 19/4155    (2006.01)
(52) U.S. Cl.
CPC ............... G05B 19/4155 (2013.01); *G05B 2219/43115* (2013.01)
(58) Field of Classification Search
None
See application file for complete search history.

(56) References Cited

U.S. PATENT DOCUMENTS

| 4,725,943 | A  | * | 2/1988  | Kuriyama  | ........ | G05B 19/4063 |
|           |    |   |         |           |          | 700/79       |
| 6,317,646 | B1 | * | 11/2001 | de Caussin| ......   | G05B 19/40937|
|           |    |   |         |           |          | 700/173      |
| 8,666,522 | B2 | * | 3/2014  | Nakamura  | ........ | G05B 19/4068 |
|           |    |   |         |           |          | 318/568.1    |
| 2003/0110006 | A1 | * | 6/2003 | Nakamura | ........ | G05B 19/406 |
|           |    |   |         |           |          | 702/176      |

(Continued)

FOREIGN PATENT DOCUMENTS

| DE | 102008001777 A1 | 11/2009 |
| DE | 102008035710 A1 | 2/2010  |

(Continued)

OTHER PUBLICATIONS

Decision to to Grant a Patent dated Sep. 20, 2016 in Japanese Patent Application No. 2014-214733 (3 pages) with an English Translation (3 pages).

(Continued)

*Primary Examiner* — Ronald D Hartman, Jr.
(74) *Attorney, Agent, or Firm* — Drinker Biddle & Reath LLP (57) ABSTRACT

A numerical control device includes an operation stop block designation unit configured to predict an executing block of a machining program at designated time, predicted to being executed at the designated time, based on machining time of each block of the machining program, and designate a stop block for the machining operation to be safely stopped, by searching from the executing block at the designated time in (Continued)

reverse order to the order to execute blocks of the machining program, and a program operation control unit configured to control to stop the machining operation at the stop block designated by the operation stop block designation unit.

8 Claims, 7 Drawing Sheets

(56) References Cited

U.S. PATENT DOCUMENTS

| | | | | |
|---|---|---|---|---|
| 2006/0229761 | A1* | 10/2006 | Kita | G05B 19/4068 |
| | | | | 700/181 |
| 2011/0015771 | A1* | 1/2011 | Guo | G05B 19/4063 |
| | | | | 700/97 |
| 2012/0179284 | A1 | 7/2012 | Nakamura et al. | |
| 2013/0184852 | A1* | 7/2013 | Kubo | G05B 19/4061 |
| | | | | 700/178 |
| 2013/0269962 | A1* | 10/2013 | Fiessler | F16P 3/144 |
| | | | | 173/1 |
| 2015/0112503 | A1 | 4/2015 | Matsumoto | |
| 2015/0378347 | A1* | 12/2015 | Sato | G05B 19/4063 |
| | | | | 700/193 |

FOREIGN PATENT DOCUMENTS

| | | |
|---|---|---|
| DE | 102011089791 A1 | 7/2012 |
| EP | 2620819 A1 | 7/2013 |
| JP | H09-190205 A | 7/1997 |
| JP | 2008-093735 A | 4/2008 |
| JP | 2009-181174 A | 8/2009 |
| JP | 2014-038483 A | 2/2014 |
| JP | 2015-080835 A | 4/2015 |

OTHER PUBLICATIONS

Office Action dated Mar. 29, 2018 in German Patent Application No. 10 2015 013 581 (8 pages) with an English translation (7 pages).

\* cited by examiner

NUMERICAL CONTROL DEVICE

RELATED APPLICATION DATA

This application claims priority under 35 U.S.C. § 119 and/or § 365 to Japanese Application No. 2014-214733 filed Oct. 21, 2014, the entire contents is incorporated herein by reference.

BACKGROUND OF THE INVENTION

1. Field of the Invention

The present invention relates to a numerical control device, and more particularly to a numerical control device which interrupts machining at designated time.

2. Description of the Related Art

The present invention relates to a numerical control device, and more particularly to a numerical control device which interrupts machining at designated time.

Heretofore, a numerical control device disclosed in Japanese Patent Laid-Open No. 2009-181174, as a numerical control device for interrupting a machining tool before designated time. The numerical control device, disclosed in Japanese Patent Laid-Open No. 2009-181174, predicts an execution block at earthquake occurrence prediction time, specifies a block as an operation stop block, in which a spindle stops or a tool or a workpiece is moved in a fast forward manner, among the blocks from currently executing block to the execution block at the prediction time, and stops the machine at the operation stop block for the sake of safely stopping the machining tool before the earthquake occurrence prediction time.

Figure 7:
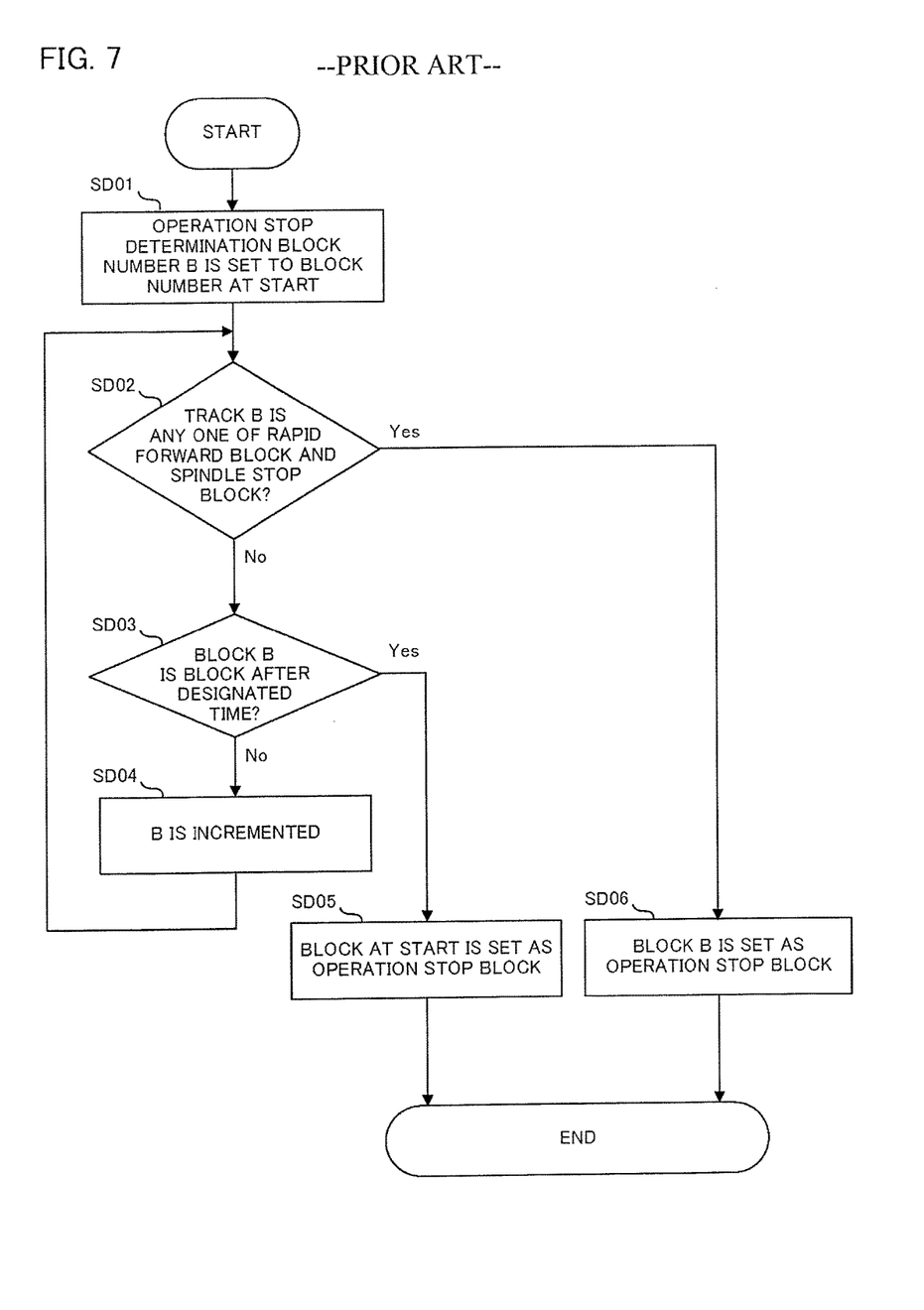
FIG. 7 is a schematic flowchart of an operation stop block designation process in a prior art.

FIG. 7 shows a schematic flowchart of specification process of the operation stop block, to be executed in the numerical control device disclosed in Japanese Patent Laid-Open No. 2009-181174.

[Step SD01] The number of the block executing at the start is set in the operation stop determination block number B.

[Step SD02] It is determined the block with the operation stop determination block number B is a rapid traverse block, a spindle stopping block, or not. The process proceeds to Step SD 06 when the block with the operation stop determination block number B corresponds to the rapid traverse block or the spindle stopping block, while the process proceeds to the Step SD03 when not.

[Step SD03] It is determined whether the block with the operation stop determination block number B is a block predicted to be executed after the stopping designated time or not. The process proceeds to Step SD05 when the block with the operation stop determination block number B is the block predicted to be executed after the stopping designated time, and the process proceeds to SD04 when not.

[Step SD04] The operation stop determination block number B is incremented and the process returns to Step SD02.

[Step SD05] The block at the start is set to be the operation stop block, and the process ends.

[Step SD06] The current block with the operation stop determination block number B is set to be the operation stop block, and the process ends.

However, in the numerical control device described in Japanese Patent Laid-Open No. 2009-181174, the nearest block to which safety stop is possible from the executing block is searched since the purpose of the numerical control device is to stop in the shortest time, so there is a problem that is impossible to machine as long as possible before the designated time.

In addition to that, in the numerical control device described in Japanese Patent Laid-Open No. 2009-181174, the acceleration/deceleration time and the execution order of the program is not considered, so the stop block is designated with poor accuracy, such that there is a problem that it is impossible to predict the block to be executed after long time.

SUMMARY OF THE INVENTION

In view of the above-described problems in the prior art techniques, a purpose of the present invention is to provide a numerical control device which enables continuation of the machining as long as possible to the designated time, when the stop time of the machining operation is designated.

The numerical control device according to the present invention is configured to stop machining operation safely before designated time arrives, when the designated time to stop the machining operation is designated, during the machining operation performed by controlling a machine based on machining program, the numerical control device including stop time input unit configured to receive the designated time, a machining time prediction unit configured to predict machining time of the machining program considering order to execute blocks of the machining program and time for acceleration and deceleration by a drive unit of the machine, an operation stop block designation unit configured to predict an executing block of the machining program at the designated time, predicted to being executed at the designated time, based on the machining time of each block of the machining program predicted by the machining time prediction unit, and designate a stop block for the machining operation to be safely stopped, by searching from the executing block at the designated time in reverse order to the order to execute blocks of the machining program, and a program operation control unit configured to control to stop the machining operation at the stop block designated by the operation stop block designation unit.

The machining time prediction unit may be configured to analyze the order to execute the blocks of the machining program, generate an execution block table storing block numbers of the blocks in the order to execute the blocks analyzed, predict machining time for each block and store the machining time in association with the block number of the blocks of the execution block table.

Commands to be used in the machining program may be classified to a plurality of levels corresponding to safety level, the operation stop block designation unit is configured to preferentially designate the block executing a command classified to high safety level as the stop block, when the operation stop block designation unit designates the stop block.

The operation stop block designation unit may include a user interface configured for an operator to search by visual observation and designate the stop block for the machining operation to be safely stopped in reverse order to the order to execute blocks of the machining program.

The present invention, with the above configuration, enables to perform machining with long program as long as possible to the designated time and safely stop the machining, for a quitting time, a holiday, planned power outrage, and the like.

BRIEF DESCRIPTION OF THE DRAWINGS

The above-described object, the other object, and the feature of the invention will be proved from the description of embodiments below with reference to the accompanying drawings. In these drawings.

DETAILED DESCRIPTION OF THE PREFERRED EMBODIMENTS

An operation stop block designation process according to some embodiments of the present invention will be descried first.

Figure 1:
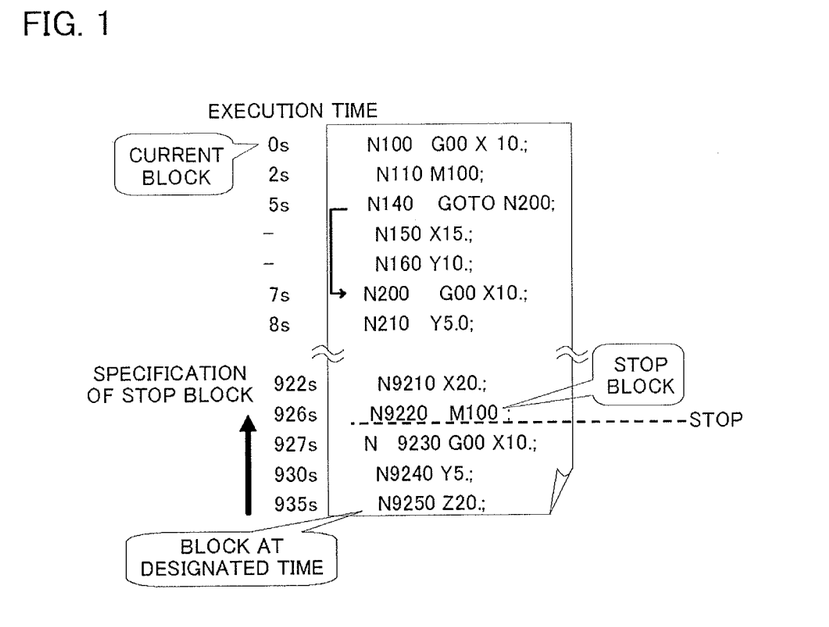
FIG. 1 is a schematic diagram of a process to designate an operation stop block according to some embodiments of the present invention.

In the process, execution order of the blocks to be executed after the currently executing block and the execution time considering acceleration and deceleration of each block are predicted when a stop block is designated. For example, when N100 is being executed in the machining program shown in FIG. 1, the blocks after N100 are executed in the order of N110, N140, N200 (Since a GOTO command is included in N140), N210, and so on, and the execution times of each block considering the acceleration and deceleration time are 2 s for N100, 3 s for N110, 2 s for N140, and 1 s for N200.

Next, the block being executed at the designated time is predicted based on the execution order and execution time of each block, the stop block satisfying a predetermined stop condition is designated by searching the program in the reverse order from the block being executed at the designated time. In the example shown in FIG. 1, a block of N9250 is predicted to be executed at the designated time when the designated time is after 935 s and the block of N9220 is designated as a block satisfying a stop condition by searching the program in reverse order from the block of N9250.

Then, the operation of the machining program is stopped when the operation based on the machining program reaches the stop program.

Figure 2:
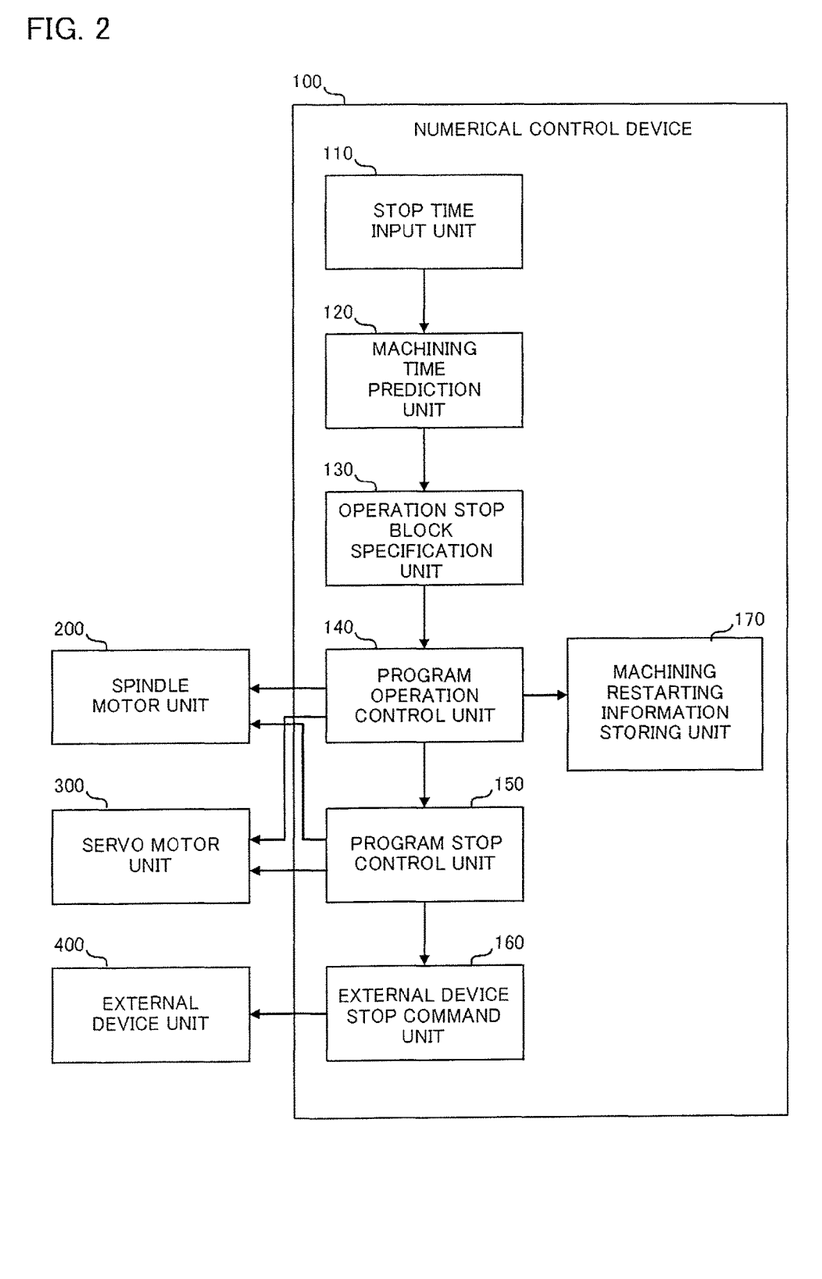
FIG. 2 is a schematic block diagram of the numerical control device according to an embodiment of the present invention.

A technical configuration of the numerical control device for implementing the process described above will be described below. FIG. 2 is a schematic block diagram of the numerical control device according to an embodiment of the present invention. The numerical control device 100 of the present embodiment includes a stop time input unit 110, a machining time prediction unit 120, an operation stop block designation unit 130, a program operation control unit 140, a machining restarting information storing unit 170, a program stop control unit 150, an external device stop command unit 160.

The stop time input unit 110 receives information of the designated time to stop the machining, and output the designated time to the machining time prediction unit 120. The stop time input unit may receive the input information by operation by the operator using an input device such as a keyboard, a MDI unit set in the numerical control device 100, or from the other devices via a communication line of a LAN, a wireless LAN, an internet, a communication line network, or the like. As an example for receiving the information via a communication line, the stop time input unit may actively obtain or passively receive a warning such as an earthquake early warning and designate the designated time by analyzing the warning, or obtain or receive information of a cause which makes the continuation of the machining operation difficult and designate the designated time.

Figure 3:
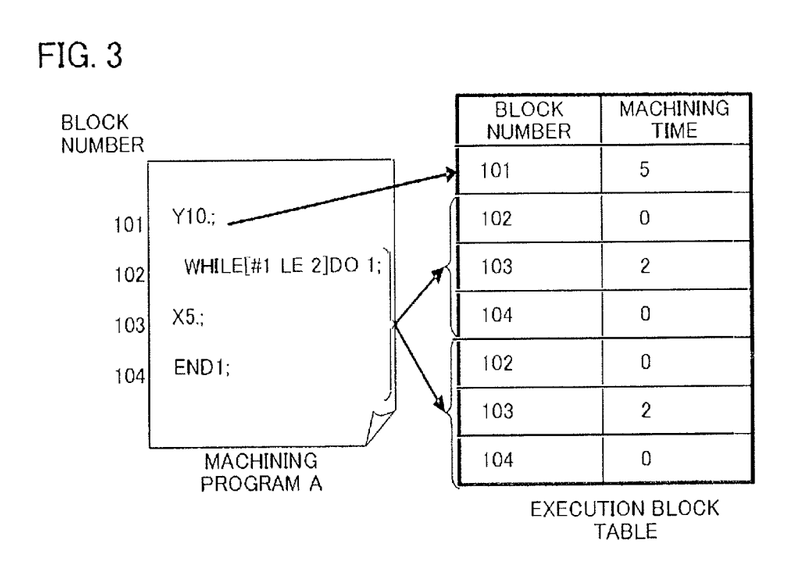
FIG. 3 is an execution block according to an embodiment of the present invention.

The machining time prediction unit 120 reads the machining program currently executed, specifies the execution order, predicts the machining time for each block, and generates the execution block table. The execution block table is a table which stores a block number in association with the prediction result of the machining time of the block of the block number, as shown in FIG. 3. The execution block table stores the block number of the block after the currently executing block in the order to be executed, based on the result of analyzation of the machining program. In an example of the machining program A shown in FIG. 3, since the WHILE sentence is included in the block of block number 102 and the blocks of the block numbers 102 to 104 are repeated twice, the block numbers are sorted and stored as shown in the right part of the figure in the execution block table.

The prediction process of the machining time executed by the machining time prediction unit 120 adopts a method disclosed in Japanese Patent Laid-Open No. 2014-038483 or the like, as a prediction method of the execution time of the block considering the processing capacity of the numerical control device, the acceleration deceleration time, and the execution order of the program, and the like. It should be noted that any method with high precision can be adopted for the prediction of the machining time.

The operation stop block designation unit 130, which is one of the features of the present embodiment, executes the operation stop block designation process to designate the block, from the current time to the designated time acquire by the stop time input unit 110, to which the machining operation is safely stopped.

When the operation stop block is designated, the block which will be being executed at the designated time is first predicted. The block at the designated time is predicted by adding the execution time of each block in the execution order from the currently executed block to the current time based on the execution block table generated by the machining time prediction unit 120, and finding the block number of the block which exceeds the designated time.

Next, the block to which the machining is safely stopped is specified by searching the blocks in the reverse order from the block predicted to be executed at the designated time. Detailed flow of the machining stop block specification process will be described later.

When the block to which the machining is safely stopped is specified, the block which executes the command the operator designated in advance may be selected. Alternatively, as a more sophisticated method, commands to be used in the machining program are classified to a plurality of levels corresponding to the safety levels as shown below, and the block to which the machining is safely stopped may be designated using the levels.

Level 1: Commands with which the workpiece may be damaged, but the machine is not damaged, including a cutting command.

Level 2: Commands with which the workpiece is not damaged when the machining is interrupted, including a rapid traverse command, or the command with which the spindle stops.

Level 3: Commands which divide the machining process, including an auxiliary command such as M/S/T/B code.

Level 4: Commands which assume the interruption, including a command which the operator designated in advance.

When the levels are set, the block for executing the command belonging to the designated level may be searched as the block to which the machining is safely stopped, or the block for executing the command belonging to equal to or higher level than the designated level may be searched as the block to which the machining is safely stopped. Alternatively, the block for executing the command belonging to the high level may be searched for the block to which the machining is safely stopped first, and when the block does not exit, the block for executing the command belonging to the level one level lower may be searched for the block to which the machining is safely.

The program operation control unit 140 controls each drive unit of the machine to be controlled including a spindle motor unit 200, a servo motor unit 300, outputs a command to stop the machining operation at the block to which the machining is safely stopped designated by the operation stop block designation unit 130 to the program stop control unit 150, and stores the restarting block number at the time of the restart from the stopping state of the machining operation in the machining restart information storing unit 170.

It should be noted that, the operation may be stopped at the stop block by the program operation control unit 140, by executing one or more commands below.

A1: Single block stop
A2: Execution of the program stop M00
A3: Execution of the optional stop M01 and output of the optional stop signal When the operation is stopped at the stop block by the program operation control unit 140, one or more commands below may be executed as preparation for turn off the power of the machining tool before or after the stop block.

B1: Output of the signal
B2: Execution of the program prepared in advance, including auxiliary code, macro, and sub program
B3: Storing of the machining restart information necessary for the machining restart of the workpiece The program stop control unit 150 receives the command from the program operation control unit 140 to perform stop control of each drive unit of the machine to be controlled such as the spindle motor unit 200, the servo motor unit 300, and commands the external device stop command unit 160 to stop the external device unit 400.

The external device stop command unit 160 receives the command from the program stop control unit 150 to safely stop the external device unit 400.

The machining restart information storage unit 170 stores the block number of the block from which the machining is restarted after the machining is stopped at the block designated by the operation stop block designation unit 130. The block number may be the block number of the block to be executed next to the block number of the stopped block. Alternatively, the block number of the block at which the machining can be restarted more appropriately, the machining surface is less likely to be damaged, is searched in the reverse order from the stopped block by analyzing the machining program.

Each process of the numerical control device with the configuration mentioned above will be described below using FIGS. 4 to 6.

Figure 4:
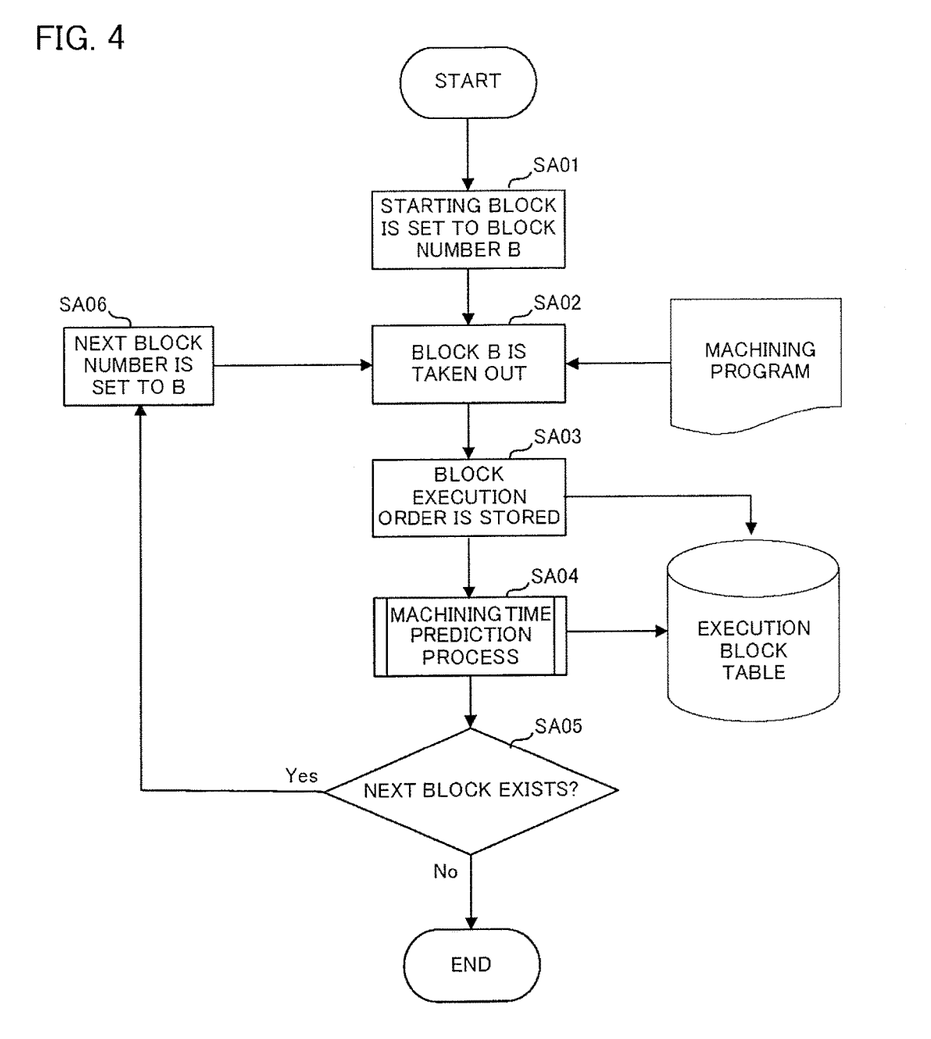
FIG. 4 is a flowchart of a process executed by a machining time prediction unit according to an embodiment of the present invention.

FIG. 4 is a flowchart of a process executed by the machining time prediction unit 120.

[Step SA01] The block number of the currently executed block at the start of the process in the machining program is set in the block number B as a variable.

[Step SA02] The block designated by the block number B is taken out of the machining program.

[Step SA03] The block number B is recorded at the end of the execution block table.

[Step SA04] The machining time prediction process is executed for the block taken out in Step SA02, the predicted machining time is recorded in the execution block table in association with the block number B. The flow of the machining time prediction process will be described later.

[Step SA05] It is determined whether the block next to the block of the block number B exists or not. Concerning the next block, the existence of the next block is determined considering the execution order when the block of the block B includes a bifurcation command, a repetition command, or the like. The process proceeds to Step SA06 when the next block exists, while the process ends when not.

[Step SA06] The block number to be executed is set in the block number B and the process returns to Step SA02.

Figure 5:
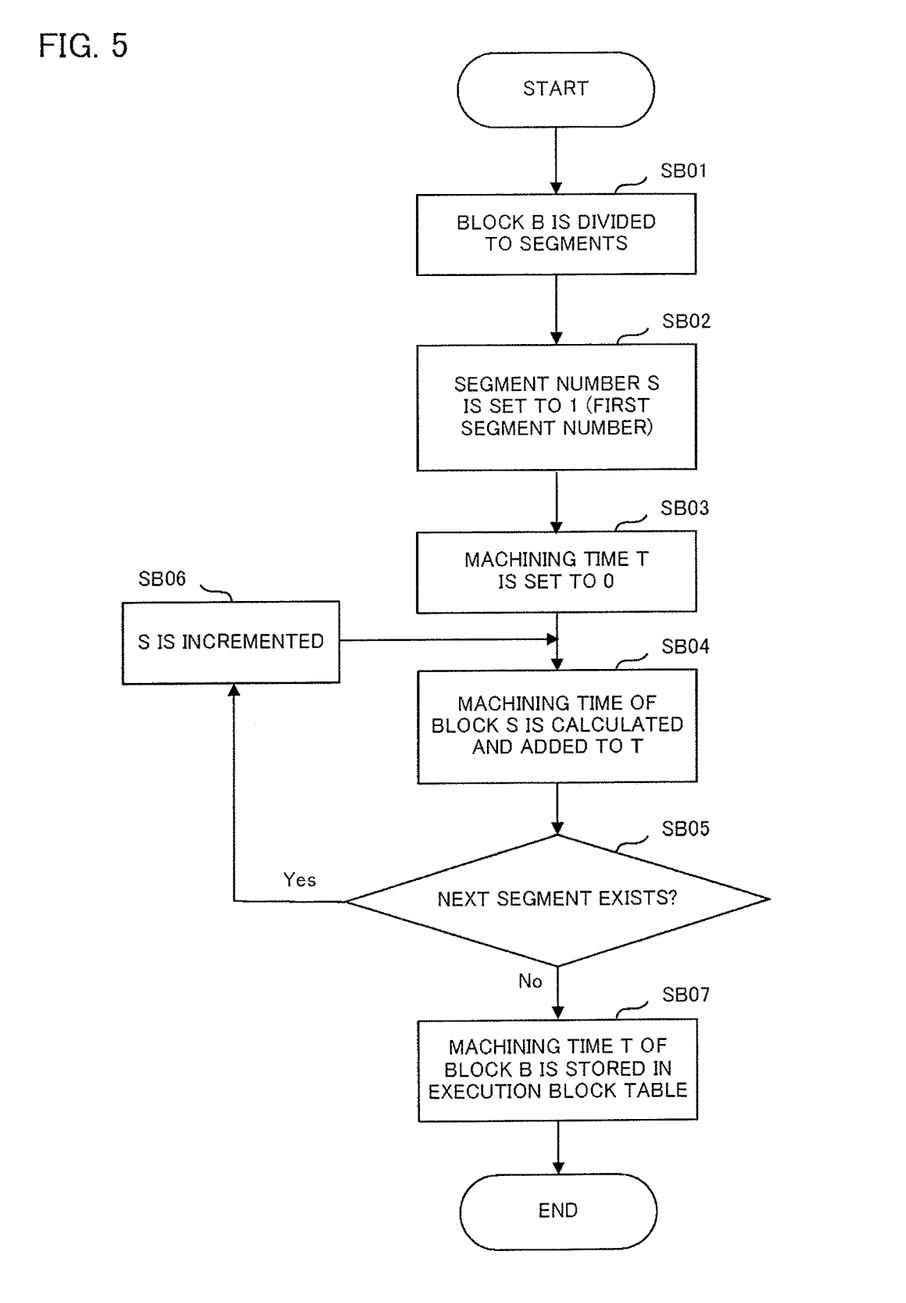
FIG. 5 is a flowchart of a machining time prediction process according to an embodiment of the present invention.

FIG. 5 is a flowchart of a machining time prediction process to be called in Step SA04 shown in the FIG. 2.

[Step SB01] The block of the block number B taken out in Step SA02 is analyzed to generate segmentation data by dividing the tool path to be controlled by the block to segments.

[Step SB02] The first segmentation number (1) of the segmentation data divided by in Step SB01 is set in the segment number S (variable).

[Step SB03] The machining time T (variable) is set to 0.

[Step SB04] The machining time (time for tool movement) of the segment designated by the segment number S is calculated and the added to the machining time T.

[Step SB05] It is determined whether the next segment (the segment for which the machining time is not calculated) exists or not. The process proceeds to Step SB06 when the next segment exists, and the process proceeds to Step SB07 when not.

[Step SB06] The segment number S is incremented to the next segment number and the process returns to Step SB04.

[Step SB07] The machining time T obtained in STEPS SB03 to SB06 is set to be the machining time of the block of the block number B.

Figure 6:
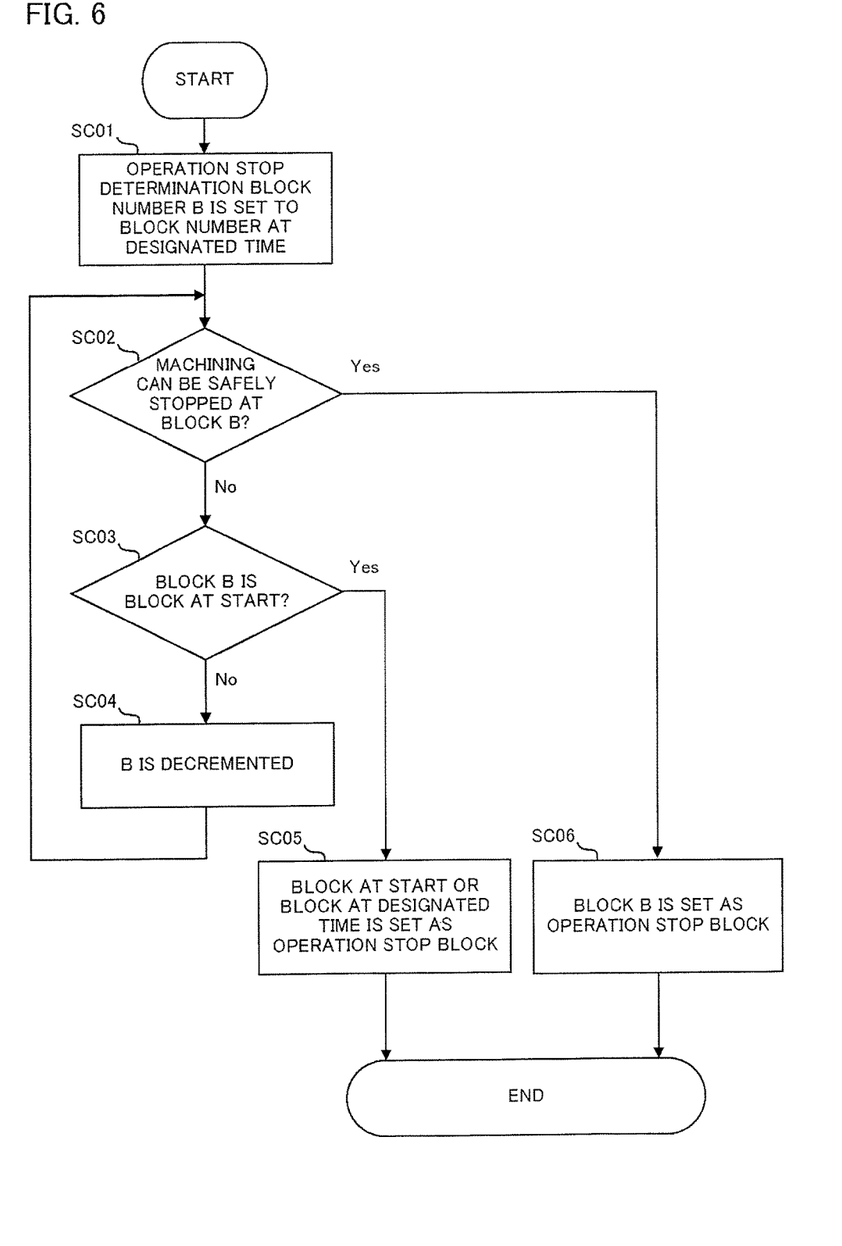
FIG. 6 is a flowchart of an operation stop block designation process according to an embodiment of the present invention.

FIG. 6 is a flowchart of an operation stop block designation process to be executed by the operation stop block designation unit 130.

[Step SC01] The block number of the block to be executed at the designated time is set in the operation stop determination block number B.

[Step SC02] It is determined whether the block of the operation stop determination block number B is a block to which the machining is safely stopped, or not. The process proceeds to the Step SC06 when the machining is safely stopped to the block, and the process proceeds to Step SC03 when not.

[Step SC03] It is determined whether the block of the operation stop determination block number B is a block being executed at the start of the process. The process proceeds to Step SC05 when the block of the operation stop determination block number B is the block being executed at the start of the process, and the process proceeds to Step SC04 when not. [Step SC04] The operation stop determination block number B is decremented to the block one before in the execution block table, and the process returns to Step SC02.

[Step SC05] The block at the start (when it is predicted to be the designated time before the execution of the block at the start is completed), or the block to be executed at the designated time, is set to be the operation stop block and the process ends.

[Step SC06] The block of the operation stop determination block number B is set to be the operation stop block and the process ends.

As mentioned above, the embodiments of the present invention is described. The present invention is not limited to the embodiments described above, but the other embodiments with some alternation are included to implement the present invention. For example, the example where the block with safe stop is automatically determined, but a method of manually selecting the block with safe stop by the operator may be adopted. In the method, the block to which the machining is safely stopped to the designated time may be manually selected by the operator in the flow below.

<1> The operator input the time to stop to the numerical control machine.
<2> The numerical control device 100 displays the block to be executed at the designated time in the currently executing machining program on the screen.
<3> The operator scrolls the machining program in the reverse order to the execution order and searches the block to which the machining is safely stopped visually.
<4> The operator designates the stop block and make the stop block be stored in the numerical control device 100.

Each block for executing a command which is classified according to safety level may be displayed with each color for each level. In this time, the operator can grasp at a glance to which block the machining can be stopped more safely, so the operator can more easily designate the stop block.

The invention claimed is:

1. A numerical control device configured to stop a machining operation without damage to a machine before a designated time arrives, when the designated time to stop the machining operation is designated, during the machining operation performed by controlling the machine based on a machining program, the numerical control device including a processor configured to execute the method comprising:
receiving the designated time;
predicting a machining time of the machining program based on an order of execute blocks of the machining program and an execution time for acceleration and deceleration by a drive unit of the machine of each block of the machining program;
predicting an executing block of the machining program at the designated time, the executing block of the machining program predicted to be executing at the designated time, based on the predicted machining time of each block of the machining program;
designating a stop block for the machining operation to be stopped without damage to the machine before the designated time, by searching from the executing block at the designated time in reverse order of the order of execute blocks of the machining program; and
controlling stopping of the machining operation at the designated stop block.

2. The numerical control device according to claim 1, wherein the processor is further configured to execute the method comprising:
analyzing the order of execute blocks of the machining program;
generating an execution block table that stores block numbers of the execute blocks in the order of execute blocks analyzed;
predicting the machining time for each block; and
storing the machining time in association with the block number of the execute blocks of the execution block table.

3. The numerical control device according to claim 1, wherein commands to be used in the machining program are classified to a plurality of levels corresponding to safety level, and
wherein the processor is further configured to execute the method comprising:
preferentially designating the block executing a command classified to a predetermined safety level as the stop block, when the stop block is designated.

4. The numerical control device according to claim 1, wherein the processor is further configured to provide:
a user interface configured for an operator to search by visual observation and designate the stop block for the machining operation to be stopped without damage to the machine in reverse order to the order of execute blocks of the machining program.

5. The numerical control device according to claim 2, wherein commands to be used in the machining program are classified to a plurality of levels corresponding to safety level, and
wherein the processor is further configured to execute the method comprising:
preferentially designating the block executing a command classified to a predetermined safety level as the stop block, when the stop block is designated.

6. The numerical control device according to claim 2, wherein the processor is further configured to provide:
a user interface configured for an operator to search by visual observation and designate the stop block for the machining operation to be stopped without damage to the machine in reverse order to the order of execute blocks of the machining program.

7. The numerical control device according to claim 3, wherein the processor is further configured to provide:
a user interface configured for an operator to search by visual observation and designate the stop block for the machining operation to be stopped without damage to the machine in reverse order to the order of execute blocks of the machining program.

8. The numerical control device according to claim 5, wherein the processor is further configured to provide:
a user interface configured for an operator to search by visual observation and designate the stop block for the machining operation to be stopped without damage to the machine in reverse order to the order of execute blocks of the machining program.

* * * * *